(12) United States Patent
Doremus et al.

(10) Patent No.: US 6,502,680 B2
(45) Date of Patent: Jan. 7, 2003

(54) FRICTION CLUTCH WITH A DEVICE FOR TAKING UP WEAR IN THE FRICTION LINERS, ESPECIALLY FOR A MOTOR VEHICLE

(75) Inventors: Olivier Doremus, Izel-les-Hameau (FR); Dominique Despres, Amiens (FR)

(73) Assignee: Valeo, Paris (FR)

( * ) Notice: Subject to any disclaimer, the term of this patent is extended or adjusted under 35 U.S.C. 154(b) by 10 days.

(21) Appl. No.: 09/768,250

(22) Filed: Jan. 25, 2001

(65) Prior Publication Data

US 2001/0009215 A1 Jul. 26, 2001

(30) Foreign Application Priority Data

Jan. 25, 2000 (FR) .............................................. 00 00949

(51) Int. Cl.[7] ................................................ F16D 13/75
(52) U.S. Cl. .................................. 192/70.25; 192/111 A
(58) Field of Search ........................... 192/70.25, 111 A

(56) References Cited

U.S. PATENT DOCUMENTS

| | | | | |
|---|---|---|---|---|
| 4,579,203 A | * | 4/1986 | Link ........................ | 192/111 A |
| 5,251,737 A | * | 10/1993 | Flotow et al. ............. | 192/111 A |
| 5,409,091 A | * | 4/1995 | Reik et al. ................ | 192/70.25 |
| 5,564,541 A | | 10/1996 | Gochenour et al. | |
| 5,645,154 A | | 7/1997 | Weidinger | |
| 5,845,750 A | * | 12/1998 | Thirion Briel et al. ... | 192/70.25 |
| 5,927,457 A | * | 7/1999 | Orlamunder et al. .... | 192/111 A |
| 5,937,986 A | * | 8/1999 | Schubert ................. | 192/111 A |
| 5,960,920 A | * | 10/1999 | Brim et al. .............. | 192/111 A |
| 6,050,381 A | * | 4/2000 | Uehara et al. ........... | 192/111 A |
| 6,098,773 A | * | 8/2000 | Blessinger et al. ...... | 192/111 A |
| 6,161,670 A | * | 12/2000 | Doremus et al. ........ | 192/111 A |
| 6,176,360 B1 | * | 1/2001 | Thirion Briel et al. .. | 192/111 A |
| 6,202,815 B1 | | 3/2001 | Bacher et al. | |
| 6,334,520 B1 | * | 1/2002 | Blard et al. .............. | 192/111 A |
| 6,394,251 B1 | | 5/2002 | De Briel | |

FOREIGN PATENT DOCUMENTS

| | | |
|---|---|---|
| FR | 2599446 | 12/1987 |
| FR | 2739160 | 3/1997 |
| FR | 2756892 | 6/1998 |
| FR | 2780119 | 12/1999 |
| GB | 2 294 301 B | 4/1996 |

\* cited by examiner

Primary Examiner—Rodney H. Bonck
(74) Attorney, Agent, or Firm—Liniak, Berenato & White

(57) ABSTRACT

A motor vehicle friction clutch, including a reaction plate, a friction disc with friction liners at its outer periphery, a pressure plate, a cover plate, axial clutch engaging mechanism controlled by declutching and acting between the cover plate and the pressure plate through respective primary and secondary abutments, the pressure plate being fixed to the cover plate that is axially displaceable for rotation with the latter, also includes a wear compensating device. One of the abutments when the clutch is engaged is displaceable axially and the compensating device is brought into operation to effect the displacement. The actuating device is controlled by a displacement in association with a detection responsive to wear in the liners and acting on at least one of the elements consisting of the actuating, compensating and displacement means. Adjustment of the nominal position of the clutch when engaged defined by the axial distance between the primary and secondary abutments when the clutch is engaged.

20 Claims, 12 Drawing Sheets

FRICTION CLUTCH WITH A DEVICE FOR TAKING UP WEAR IN THE FRICTION LINERS, ESPECIALLY FOR A MOTOR VEHICLE

FIELD OF THE INVENTION

The present invention relates to a friction clutch, especially for a motor vehicle, and more particularly relates to a clutch having a wear compensating device, for taking up wear in, in particular, the friction liners. Such a device can be called a wear take-up or wear compensating device.

BACKGROUND OF THE INVENTION

A conventional friction clutch generally includes a reaction plate, which may be in two parts to define a damped flywheel or a flexible flywheel, which is mounted in rotation on a first shaft, typically a driving shaft such as the crankshaft of the internal combustion engine of the vehicle, and supporting by its outer periphery a cover plate to which at least one pressure plate is attached.

The pressure plate is fixed with respect to the cover plate and reaction plate for rotation with them, while being displaceable axially under the biasing action of resilient clutch engaging means acting axially and controlled by clutch disengaging means. The clutch engaging means may consist of helical springs or one or a pair of Belleville rings mounted in series or in parallel and subjected to the action of declutching levers constituting the declutching means. Generally, the means for engaging and disengaging a clutch consist of the same component, for example a metallic diaphragm bearing on the cover plate. The diaphragm may be mounted in series or in parallel with a Belleville ring in order to provide assistance to the declutching force, in the manner described for example in French patent specification FR 2 753 758A.

A friction disc, carrying friction liners at its outer periphery and fixed to a shaft for rotation with the latter, this shaft being typically a driven shaft such as the input shaft of the gearbox of the vehicle, is interposed between the pressure plate and the reaction plate in such a way as to be gripped between them when the clutch is in its engaged state. The clutch engaging means control the axial displacement of the pressure plate when they are actuated by a clutch release bearing through the declutching means.

During the working life of such a clutch, the friction liners, as well as the backing or counter elements consisting of the pressure plate and reaction plate, become worn. This causes variation in the position of the pressure plate and the positions of the axially acting clutch engaging means and clutch release bearing. One consequence of this is that the force with which the friction disc is gripped between the pressure and reaction plates is subject to variation because the working conditions of the clutch disengaging means are modified. Another consequence is that the force necessary to disengage the clutch is affected. By giving such a clutch a wear compensating device, these drawbacks are avoided, with the clutch engaging means and the clutch release bearing, which is typically in constant engagement on the declutching means, occupying the same position when the clutch is in its engaged condition.

A friction clutch equipped with a wear compensating device is so arranged that one of the abutments of the clutch engaging means, whether this is the abutment which is connected directly or indirectly to the cover plate or whether it is the one connected directly or indirectly to the pressure plate, is displaceable axially. A so-called compensating means is provided for carrying out this displacement, in association with a so-called actuating means which actuates the compensating means, and a displacement means which itself controls the actuating means by authorising (or otherwise) the operation of the actuating means. A wear compensating device is of course controlled by a so-called detecting means which senses wear in the liners, directly or indirectly. In other words, it senses, for example, the position of at least one of the components of the clutch that is influenced by such wear, with the detecting means actuating the compensating means or the actuating means or the displacement means.

Various types of wear compensating device are known. For example French patent specification No. FR 2 753 503A describes a clutch in which the wear compensating device comprises ramp means disposed circumferentially and constituting the compensating means, being located axially between the displaceable abutment and the pressure plate and adapted to be driven in rotation by means of a set of teeth which they carry at their periphery and with which there cooperates a tangentially disposed worm. Means for driving the worm in rotation are provided, and are activated by wear in the friction liners, the worm and worm driving means being carried by a support which is fixed to the cover plate, and the elastic, axially acting clutch engaging means consisting of a diaphragm. The worm driving means are controlled by the diaphragm. The ramp means consist of an annular ring which defines the displaceable abutment of the diaphragm and inclined ramps which are spaced apart circumferentially, while the pressure plate has pads or ramps which are arranged to cooperate with the ramps of the ramp means itself. The worm is mounted for sliding movement along its axis and is subjected to the action of an elastic means or so-called take-up means, constituting the actuating means; and, when it is displaced along its axis it drives the ramp means in circumferential rotation.

In the same clutch, the worm driving means consist of a ratchet wheel fixed to the worm and associated with a pawl which cooperates with the ratchet wheel. In this case, the detecting means is in the form of a tongue actuated by the diaphragm and adapted to cooperate with the ratchet wheel, its course of travel being increased with increasing wear, until, when the clutch is engaged, it is able to push a tooth of the ratchet wheel and cause the worm to turn, so compressing the elastic take-up means. The displacement means is represented by a diminution of the load on the area of engagement during the declutching operation, in which the elastic take-up means, when its load is sufficiently high to overcome friction forces, enables the inclined ramps to be displaced and therefore the pressure plate abutment to be displaced axially.

Thus, the detecting means, which in this case is the tongue controlled by the diaphragm, acts via the ratchet wheel on the actuating means which in this case is the elastic take-up means, thus producing an actuating force. The actual displacement takes place during a subsequent declutching operation.

In United Kingdom patent specification GB 2 294 983A, the clutch engaging means consist of a diaphragm and the displaceable abutment is again the pressure plate abutment. The detecting means consists of a pin which extends frictionally through the pressure plate and is in engagement on the reaction plate. The compensating means again consists of ramps. The actuating means is a spring which is in permanent engagement between the ramps and counter-ramps in the direction of the increase of axial thickness.

Here again, the displacement is obtained during the declutching operation by a reduction in the load on the area of contact, while the pressure plate is displaced as a function of wear with respect to the pin, which carries an abutment in the form of a lever cooperating with the ramp means. The detecting means therefore acts on the compensating means.

In United Kingdom patent specification GB 2 294 301A, the clutch engaging means again consist of a diaphragm, the compensating means are ramps, and the actuating means is again a spring acting permanently between the ramps and (in this case) the cover plate. In this case the displaceable abutment is the primary abutment carried by the cover plate, the clutch being of the push to release type and the displacement being obtained by withdrawal or retraction of the secondary abutment which is in facing relationship with the elastically mounted primary abutment on the pressure plate side, the maximum declutching force increasing with wear. This constitutes the detection means which, by retracting, also constitutes the displacement means. The detecting means can therefore be said to act on the displacement means.

A clearance appears between the primary and secondary abutments during the retraction of the secondary abutment: this clearance is taken up by a movement of the primary abutment, effected by the actuating means.

In U.S. Pat. No. 5,564,541, in the version shown in FIG. 10 of that document, the detecting means is a pin which is arranged with a clearance between the cover plate and reaction plate, and which extends frictionally through the pressure plate, the force needed for displacing the pin with respect to the pressure plate being greater than the return force of the pressure plate, which in this case is due to the tangential tongues. The actuating means is a spring which acts permanently between the pressure plate and the ramps constituting the compensating means. It is the pressure plate abutment that is displaceable here, the clutch being of the pull to release type. In this case the course of travel varies in the declutching direction: the position of full disengagement of the clutch is fixed so that the displacement occurs at the end of the declutching operation, after wear has been detected and after the appearance of a clearance which is then taken up under the action of the actuating means.

In French patent specification FR 2 599 446A, in the version shown in FIG. 5 of that document, the elements are similar to those in the above mentioned United States patent, except that the compensating means is an axial one-way free wheel, and the actuating means is a spring which permanently biases the balls into engagement against their ramps.

In the version shown in FIG. 3 of U.S. Pat. No. 5,564,541, the detecting means is a pin which is arranged with a clearance between the cover plate and the pressure plate and extending frictionally through the cover plate. The force needed to displace the pin with respect to the cover plate is greater than the return force of the pressure plate, which in this case is due to the tangential tongues. The actuating means is a spring which acts between the cover plate and an annular rotary ring having ramps arranged to cooperate with counter ramps or backing ramps. It is accordingly the cover plate abutment that is displaceable in this case, the clutch being of the pull to release type. The displacement is produced at the end of the declutching operation, after wear has been detected and after the appearance of a clearance which is taken up by the actuating means. As in FIG. 10, the configuration on full declutching is fixed, the clutch engaging means including declutching levers associated with helical springs which bear on the cover plate.

As mentioned above, the wear take-up device ensures for the clutch engaging means (for example the diaphragm) the same engagement position regardless of the state of wear, namely the position which it occupied when the liners were new and the clutch was being fitted on the vehicle. It is of course important that this so-called nominal position corresponds to the desired nominal load exerted by the diaphragm on the pressure plate when the clutch is engaged. The position of the diaphragm, or in practice its inclination, is clearly fixed by the abutments, primary and secondary, on which it bears through its outer part, which is a Belleville ring. The primary abutment is carried by the cover plate and the position of the secondary abutment is a function of the positioning of the ramp means with respect to the counter ramp means. Positioning is ensured by the adjusting function. In a clutch of the kind described in French patent No. 2 753 503, it is ensured by the assembly consisting of the ratchet wheel, worm and control tongue adapted to cooperate with the control abutment.

This assembly is comprised in a cassette which has a specific support member for mounting the assembly therein.

For the nominal positioning of the diaphragm, the mechanism is associated with a notional friction disc, and a certain number of clutch engaging and disengaging operations are carried out, until the control tongue in engagement on the control abutment no longer jumps over a tooth of the ratchet wheel, the secondary abutment of the diaphragm being then correctly positioned.

As has been seen, the clutch mechanism is constructed by assembling together various components. These components are made, and are assembled together, with certain tolerances. This affects the precision of the relative positioning of the primary abutment and control abutment when these latter are formed on two different components as in the case in the above mentioned document, in which the primary abutment is carried by the cover plate and the control abutment by the support assembled to the cover plate.

In French patent application No. 98 16547 filed on Dec. 29, 1998, it was proposed to form the control abutment on the cover plate, like the primary abutment means.

It is thus easy to position the control abutment accurately with respect to the primary abutment means, especially when the primary abutment means are made in the form of circumferential press-formed elements formed in the base of the cover plate, the primary abutment means and the control abutment being formed simultaneously during fabrication of the cover plate.

DISCUSSION OF THE INVENTION

The object of the present invention is to obtain in a simple way the accuracy required in the nominal position of the clutch engaging means, regardless of the type of primary abutment means or wear compensating device, and therefore regardless of the type of clutch mechanism involved.

According to the invention, a friction clutch, in particular for a motor vehicle, of the kind comprising a reaction plate adapted to be mounted on a driving shaft for rotation with the latter, a friction disc carrying at its outer periphery friction liners and adapted to be mounted on a driven shaft for rotation with the latter, a pressure plate, a cover plate fixed on the reaction plate, axially acting clutch engaging means which are controlled by declutching means, and which act between firstly the cover plate and secondly the pressure plate through primary abutment means and secondary abutment means respectively, the pressure plate being fixed to the cover plate for rotation with the cover plate while being displaceable axially with respect to the cover plate, and being subjected to the action of resilient return means biasing the pressure plate axially towards the cover plate, the said clutch further including a wear compensating or wear take-up device, with one of the abutments of the clutch engaging means being displaceable axially and the wear take-up device including a compensating means which is brought into operation by an actuating means adapted to effect the said displacement, the said actuating means being controlled by a displacement means in association with a detection means sensitive to wear in the liners, acting on at least one of the elements consisting of the actuating means, compensating means and displacement means, is characterised by the fact that adjustment means are provided for adjusting the nominal position of the clutch engaging means defined by the axial distance between the primary and secondary abutments, with the clutch in its engaged position.

Further features of the invention are defined in the dependent Claims of this Application.

Further features and advantages of the invention will appear more clearly from the following description of some preferred embodiments of the invention, which are given by way of non-limiting example only, for illustrative purposes only, and with reference to the accompanying drawings.

BRIEF DESCRIPTION OF THE DRAWINGS

FIG. 8 is a view as seen in the direction of the arrow VIII—VIII in FIG. 10, FIG. 9 is a view seen in the direction of the arrow IX in FIG. 8, and FIG. 10 is a view in cross section taken on the line X—X in FIG. 8.

Figure 26:
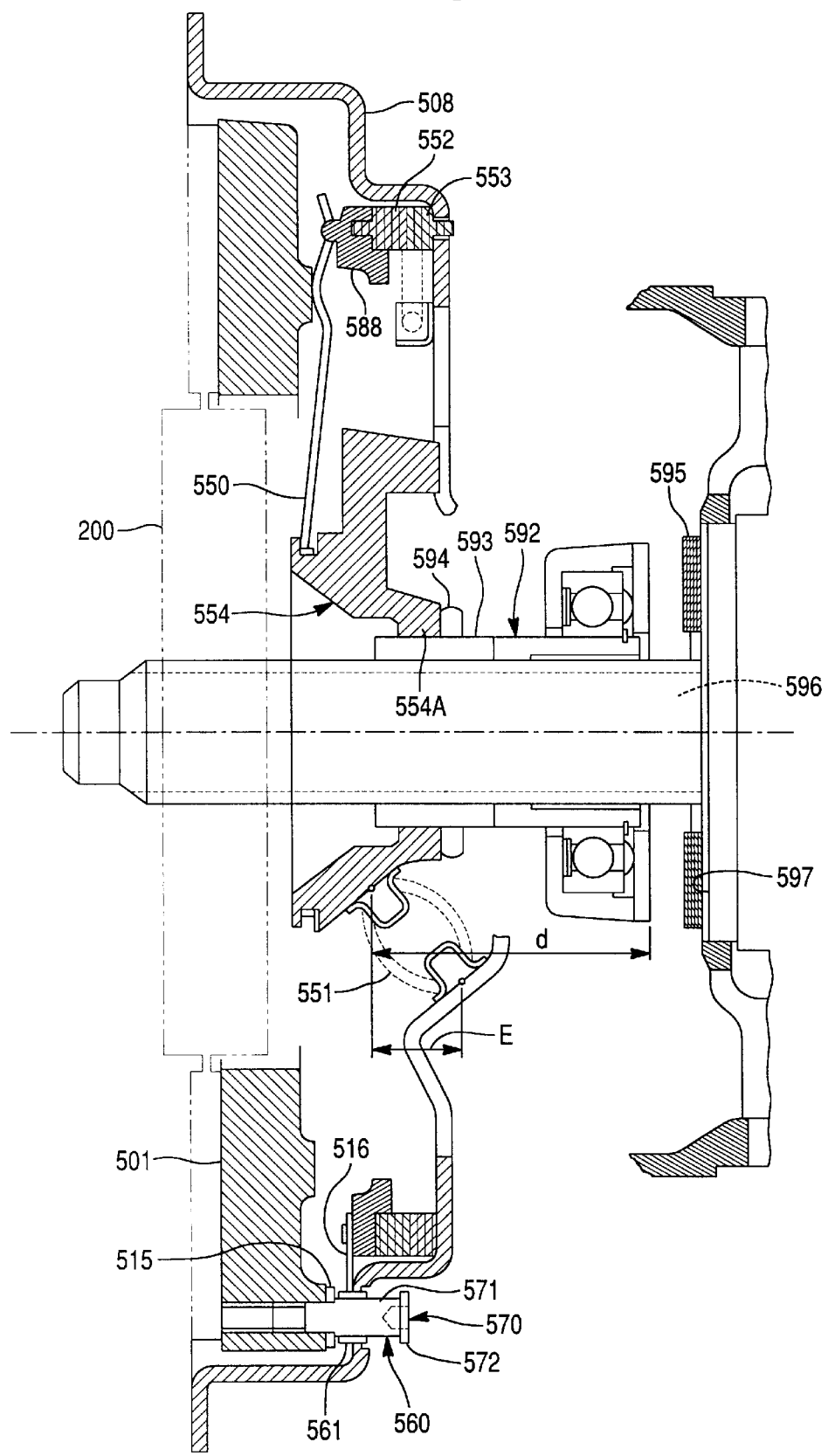
Figure 27:
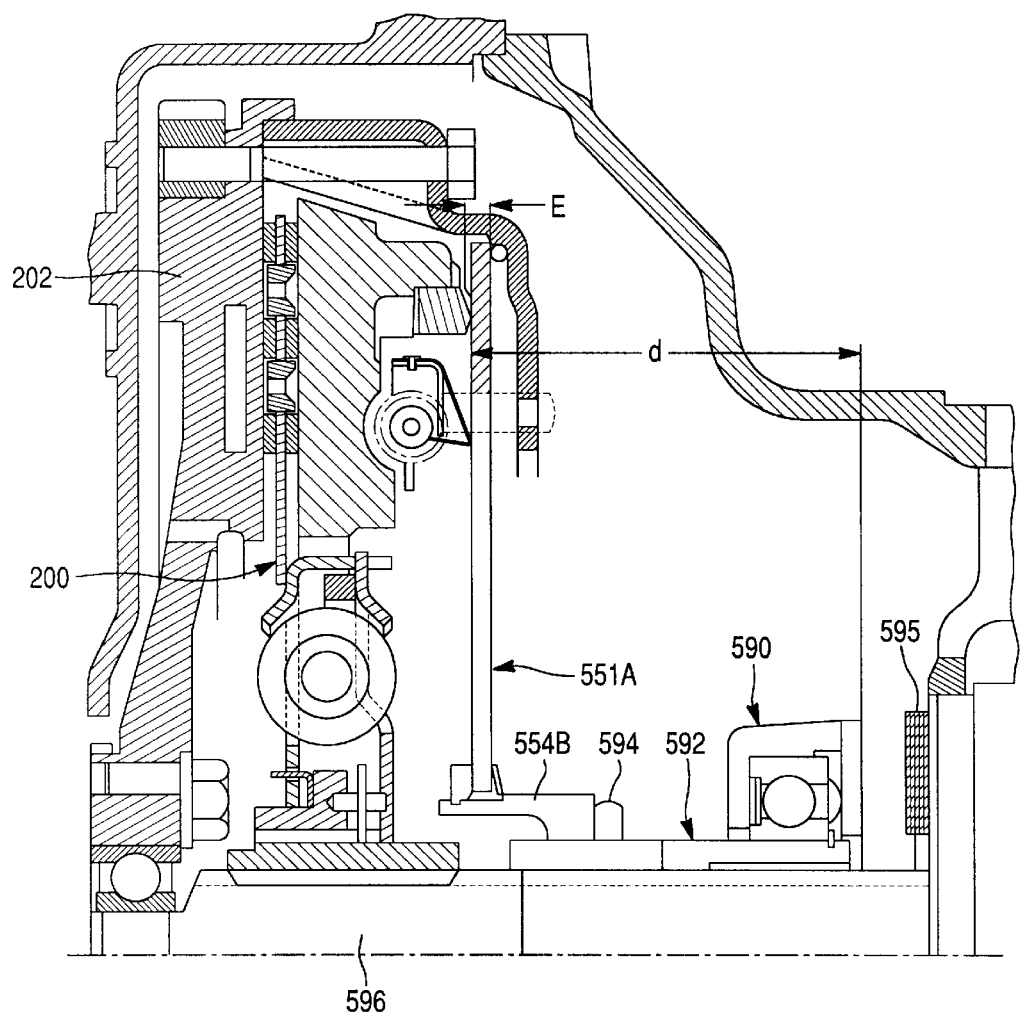

Each of FIGS. 26 and 27 shows, in axial cross section, a clutch according to the invention of the pull to release type, associated with apparatus for braking a gearbox input shaft.

DESCRIPTION OF PREFERRED
EMBODIMENTS OF THE INVENTION

Figure 1:
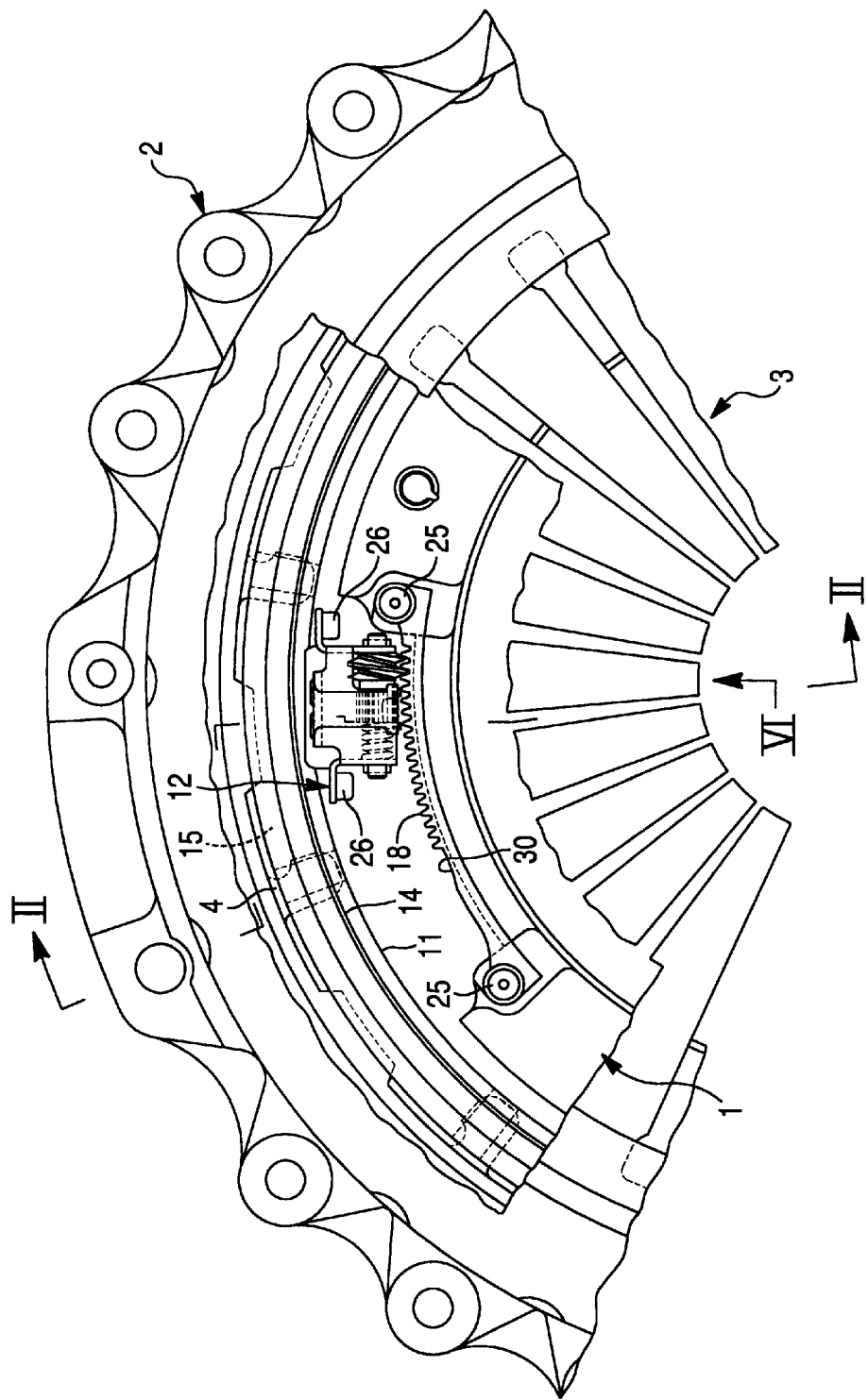
FIG. 1 is a partly cut away top plan view of a clutch equipped with a wear compensating device in the prior art, shown with new liners.
Figure 3:
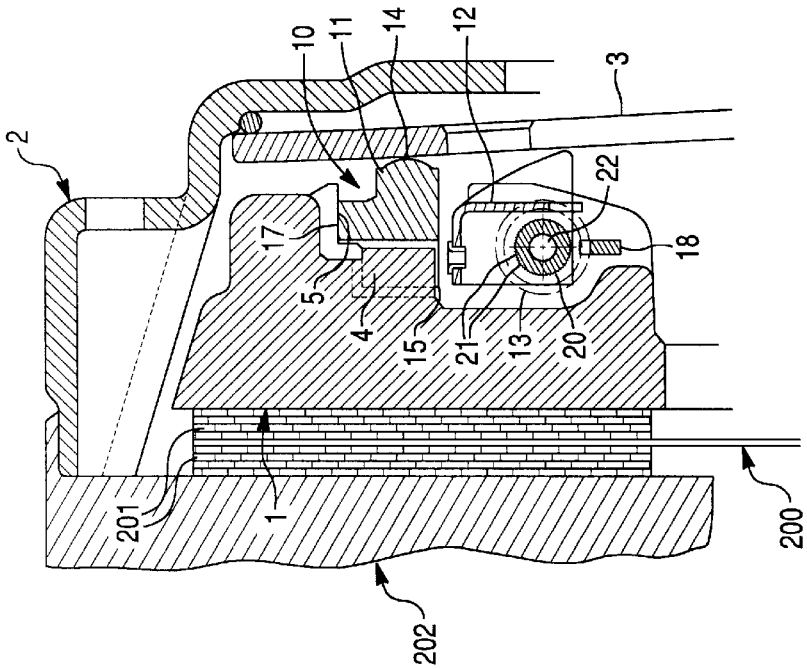
FIG. 3 is a view similar to FIG. 2 with the clutch shown disengaged.

Reference is first made to FIGS. 1 to 10, which show a known type of friction clutch mechanism, intended in particular for a motor vehicle. The clutch mechanism includes a pressure plate 1 arranged to cooperate with a friction disc 200 which carries at its outer periphery friction liners 201. The liners 201 cooperate with a reaction plate 202. In FIG. 3, in the interests of simplifying the drawing, the friction disc 200, friction liners 201 and reaction plate 202 are omitted.

The reaction plate 202 is arranged to be mounted on a driving shaft which may for example be the crankshaft of the internal combustion engine of the vehicle. The friction disc 200 is mounted to be rotatable with a driven shaft, for example the input shaft of the gearbox. More precisely, the liners 201 are fixed to a support which is rigidly or elastically coupled to a hub, the hub being mounted in rotation on the input shaft and constituting the output element of the friction disc 200. In the region of the friction liners 201, the support is elastic in the axial direction in the manner described for example in British published patent specification No. GB 2 294 301A, so as to give a progressively acting friction disc.

The pressure plate 1 is coupled to a hollow cover plate 2 for rotation with the latter, by means of tangential tongues which are not shown in the drawings. These tongues, which are elastic, also serve as return means biasing the pressure plate 1 towards the cover plate 2. The cover plate 2 is press-formed in metal in this example.

The pressure plate 1, while being fixed with respect to the cover plate 2 for rotation with the latter, is displaceable axially with respect to the cover plate 2, under the controlled biasing action of axially acting resilient means, which in this example consist of a diaphragm 3 bearing on the cover plate 2 through its outer periphery. In this example, the clutch is of the pull to release type in which the operation of disengaging the clutch is carried out by acting on the ends of the fingers of the diaphragm 3 in the direction of the arrow F in FIG. 2.

In order, when the clutch is in its engaged condition, to maintain the diaphragm 3 in a position independent of the wear that takes place in the liners of the friction disc, and (to a lesser extent) wear in the pressure plate 1 and reaction plate 202, the so-called friction faces of which become worn by contact with the liners 201, a wear compensating or wear take-up device 10 is provided.

The wear take-up device 10 includes ramp means 11 which are arranged circumferentially. More precisely, the ramp means 11 consist of an annular ring formed with circumferentially arranged ramps 15. This annular ring also includes engagement zones 14 having a rounded top edge, or chamfered in another version, the engagement zone 14 being centred on the axis of the clutch and located axially outside the ramps 15.

The pressure plate 1 is formed with pads 4 on that one of its faces that faces towards the base of the cover plate 2. These pads, which in this example are formed integrally by moulding and are machined, are spaced apart circumferentially at a distance from each other which corresponds to the distance by which two successive ramps 15 are separated circumferentially. Each pad 4 is arranged to cooperate with one ramp 15.

The ramp means 11 are located axially between the diaphragm 3 and the pressure plate 1, so that the pads 4 receive the ramps 15, and the diaphragm 3 is in cooperation with the engagement zones 14. The diaphragm 3 accordingly acts on the pressure plate 1 through the interposed engagement zones 14.

The ramp means 11 include at their outer periphery a cylindrical wall 17 parallel to the axis of the clutch and cooperating with a coaxial cylindrical recess 5 of the pressure plate. The recess 5 is formed on the face of the pressure plate that faces towards the base of the cover plate 2, so that the ramp means 11 are centred with respect to the pressure plate 1. The ramp means 11 constitute a compensating means in the way to be described below.

Figure 8:
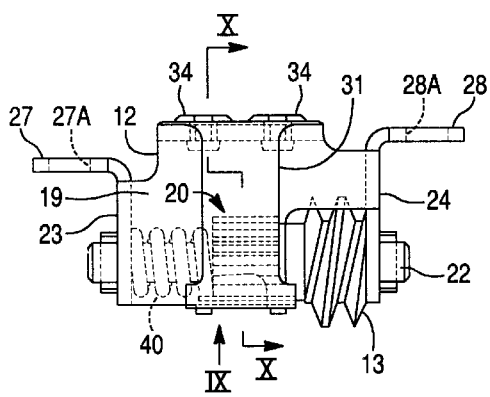
FIGS. 8 to 10 show the one-piece sub-assembly consisting of the support, the worm, the ratchet, the spring, the spindle and the resilient member.
Figure 9:
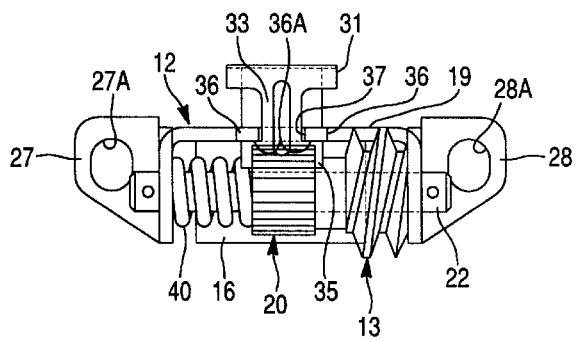
Figure 10:
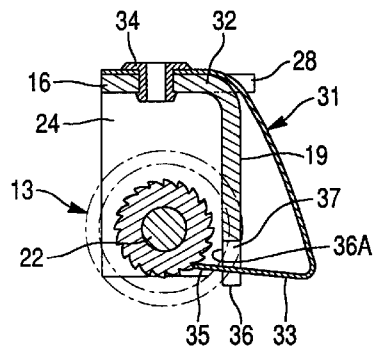
Figure 11:
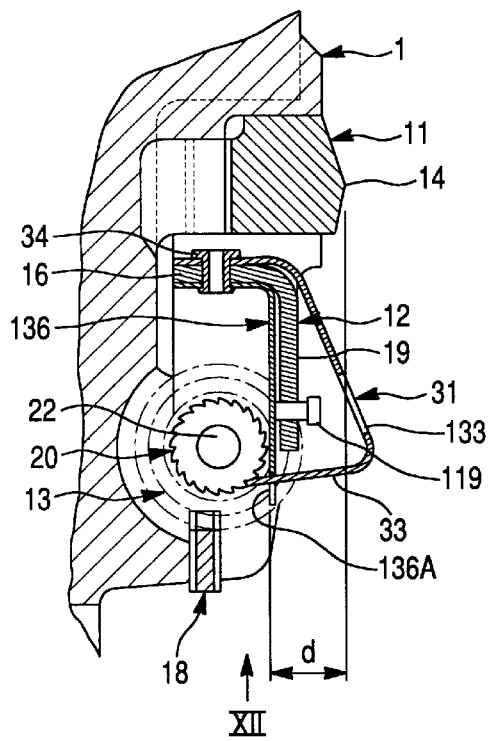
FIG. 11 is a scrap view similar to FIG. 10, and shows the application of the invention to the clutch which is shown in FIGS. 1 to 10.
Figure 12:
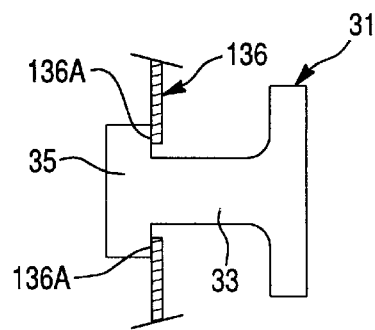
FIG. 12 is a scrap view seen in the direction of the arrow 12 in FIG. 11.
Figure 13:
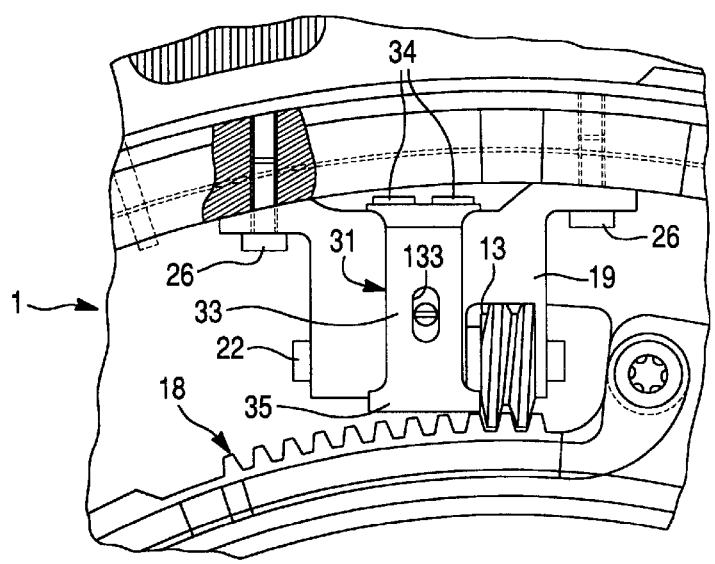
FIG. 13 repeats a small part of FIG. 1, showing part of the clutch according to the invention on a larger scale.

The wear take-up device 10 also includes a ratchet wheel 20 with inclined teeth 21, which is carried by a spindle 22 that also carries a worm 13. The spindle 22 of the ratchet wheel 20 is carried by a support 12 which is best seen in FIGS. 8 to 10. In this example, the support 12 is press-formed from metal plate and formed by bending into a U-shape with a spine portion 19 and two wing portions 23 and 24 for supporting the spindle 22. For this purpose, each of the wing portions has a circular hole matched to the diameter of the spindle 22. The wing portions 23 and 24 are extended so that they are L-shaped, by arms 27 and 28 respectively, which are spaced apart at right angles to the spine portion 19.

The support 12 is arranged to receive a resilient member 31 which in this example is of metal and which is generally C-shaped. The member 31 has an end portion 32 by which the resilient member 31 is secured, in this example by means of rivets 34, on a return 16 of the spine portion 19 of the support 12. The return 16 extends in this example at right angles to the spine portion 19 and is aligned with the arm 28. The other end portion 33 of the resilient member 31 is T-shaped and terminates in a control tongue 35.

When the resilient member 31 and the ratchet wheel 20 are mounted on the support 12, the control tongue 35 is in cooperation with the root of a tooth of the ratchet wheel 20. A helical compression spring 40 is placed between the ratchet wheel 20 and the wing portion 23 of the support 12, being wound around the spindle 22, and the worm 13 and ratchet wheel 20 are made as a single piece. As can be seen, the support 12, equipped with this piece 13, 20, the resilient member 31, spring 40 and spindle 22, constitutes a one-piece sub-assembly ready to be fitted.

As will be described below, the helical spring 40 constitutes an actuating means. The thread and pitch of the worm 13 are matched to a set of teeth 18. The worm 13 is arranged to cooperate with the teeth 18 under the conditions which will be described below.

Figure 6:
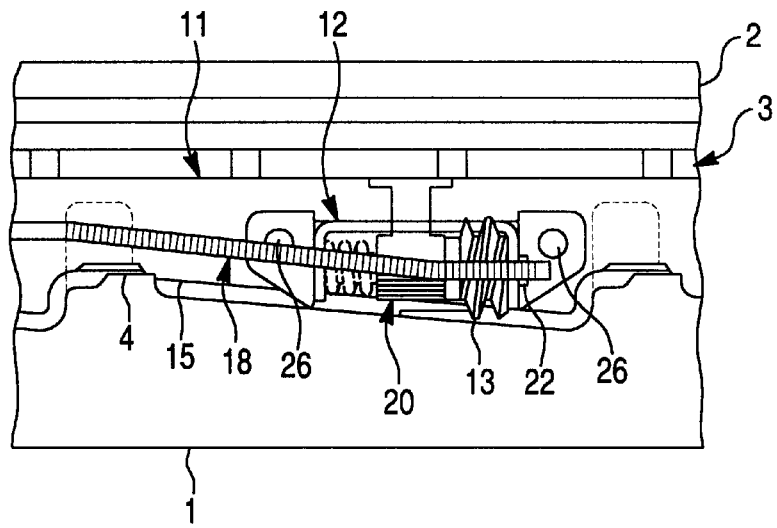
FIG. 6 is a scrap view seen in the direction of the arrow VI—VI in FIG. 1.
Figure 7:
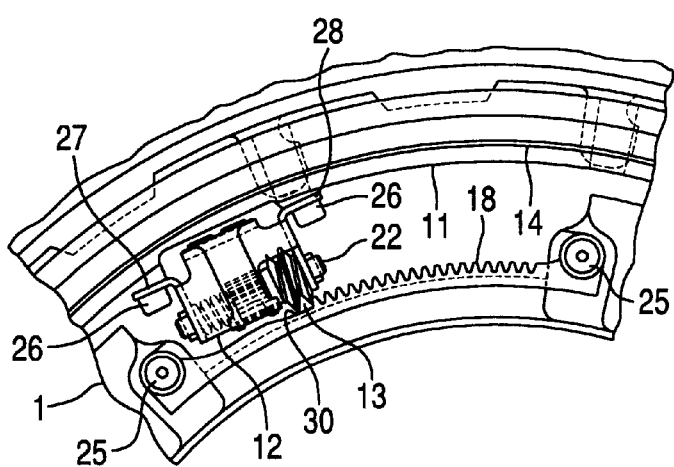
FIG. 7 repeats a part of FIG. 1, except that it shows the clutch in the condition in which the wear compensating device is no longer in operation, having taken up a certain amount of wear.

The teeth 18 are best seen in FIGS. 6 and 7. They are carried by a member, fabricated by bending from sheet metal into a generally flattened Z-shaped form and secured by its ends, by means of screws 25 shown in FIG. 1, on bosses of the pressure plate 1. As is best seen in FIG. 6, these ends of the flattened Z-shaped member lie transversely with respect to the axis of the clutch, and are joined together by an inclined portion parallel to the ramps 15.

The support 12, carrying the ratchet wheel 20, worm 13 and helical spring 40, is secured to the ramp means 11 by, for example, the screws 26. This being so, the diaphragm 3 is displaced with respect to it during the operations of disengaging and engaging the clutch. It will be understood that, with this arrangement, during tilting of the diaphragm 3 in the clutch engaging operation, the diaphragm displaces the control tongue 35, which cooperates with the teeth 21 of the ratchet wheel 20 and is thereby caused to rotate the ratchet wheel 20 clockwise. On the return stroke, the elasticity of the resilient member 31 and the inclination of the teeth 21 cause the control tongue 35 to be displaced towards the right in FIGS. 2 to 5, climbing on the teeth 21. As a function of wear in the liners 201, the inclination of the diaphragm 3 varies in such a way that the control tongue 35 associated with the diaphragm 3 constitutes a sensing means for detecting the state of wear in the friction liners 201.

Figure 2:
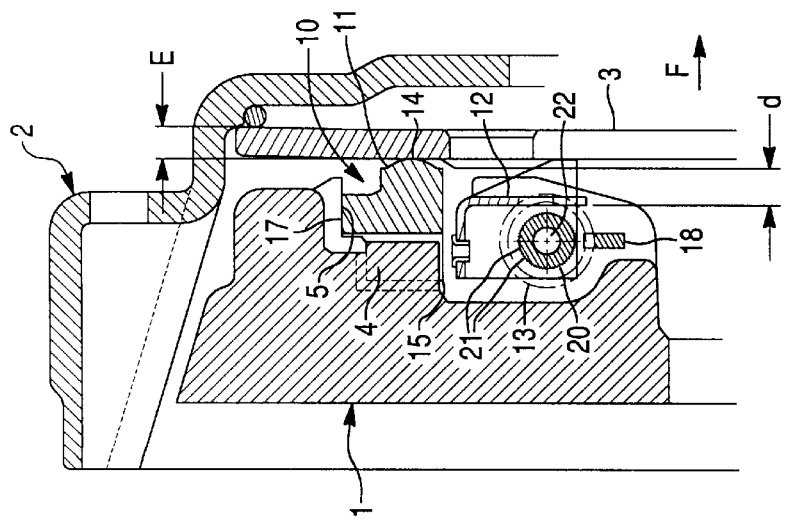
FIG. 2 shows part of the clutch, in cross section taken on the line II—II in FIG. 1.

The wear take-up device just described operates in the manner which will now be described with reference to FIG. 2. FIG. 2 shows the clutch in the engaged condition, with the friction liners 201 (FIG. 3) being new and being gripped between the reaction plate 202, FIG. 3, and the pressure plate 1. In this condition, the end of the control tongue 35 lies at the root of a tooth of the ratchet wheel 20.

When the clutch is disengaged, the diaphragm 3 tilts, and during its tilting displacement, it progressively releases the control tongue 35, the end of which follows the ramp constituted by the tooth at the root of which it was during the previous step. The support 12 is positioned axially in such a way that the axial distance d that exists between the secondary abutment 14 and the control abutment 36A (FIG. 10) that limits the course of travel of the control tongue 35, is such that, during this declutching course of travel (when the liners are new), the free end of the control tongue 35 does not jump over a tooth, as can be seen in FIG. 3. This result is achieved by the end portion 33 of the resilient member 31 coming into abutment against the support 12, and more precisely against the control abutment 36A which consists of the faces 36A, facing towards the ratchet wheel 20, of the flanks 36 of a slot 37 formed in the spine portion 19 of the support 12. This control abutment limits the course of the return movement of the control tongue 35, whatever may be the amount of return movement of the diaphragm 3, as is shown in FIG. 9. The end portion 33 is in the form of a T, the upright of which moves within the slot 37 with its cross bar constituting the control tongue 35.

Figure 4:
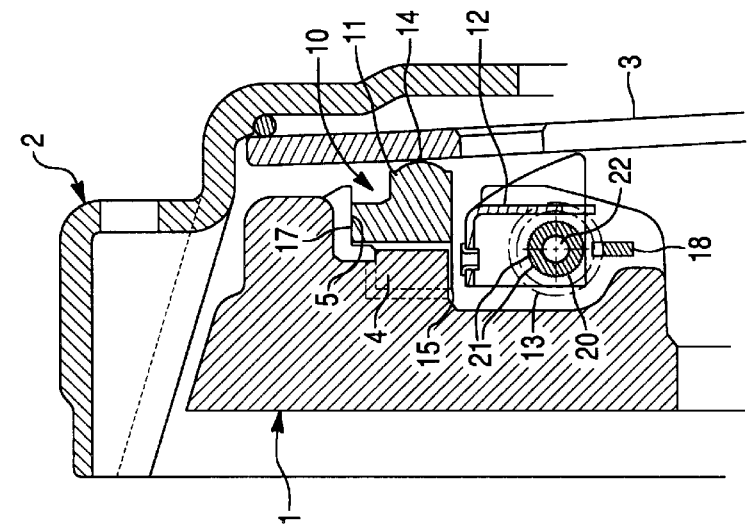
FIG. 4 is a view similar to FIG. 2 with the clutch shown after some liner wear has taken place.

As the liners become worn, and in the known way, the pressure plate 1, which is still subjected to the axial force exerted by the diaphragm 3, approaches the reaction plate, which is fixed axially as is the cover plate 2. The diaphragm 3 therefore moves closer to the reaction plate, that is to say therefore, also to the open end of the cover plate 2, carrying in its movement the control tongue 35. The ratchet wheel 20 rotates clockwise about its axis. The engaged clutch, when the liners are in their worn state, is shown in FIG. 4. This driving of the ratchet wheel 20 in rotation causes the worm 13 also to rotate about its axis. Since the ramp means 11 are immobilised with respect to the cover plate 2 because of the force exerted by the diaphragm 3, the worm 13, meshing with the teeth 18, displaces the teeth 18 by a small amount, so slightly compressing the helical spring 40. The direction of the thread of the worm 13 is chosen accordingly.

During the declutching operation which follows a phase such as that just described in which wear takes place, the pressure plate 1 releases the liners, being displaced further away from the latter under the action of the tangential tongues 9 which displace towards the base of the cover plate 2 the pressure plate 1 and the ramp means 11, which are in contact with the diaphragm 3 through their engagement zones 14 and with the pads 4 of the pressure plate 1 through their ramps 15, with the end of the tongue jumping over the tooth.

The helical spring 40 biases the worm 13 towards the wing portion 24 of the support 12 from which it has become separated during the wear phase, that is to say from right to left in relation to FIGS. 2 and 3. The load exerted by the diaphragm 3 is no longer applied on the ramp means 11, so that the only force to be overcome in order to be able to turn the ramp means 11 with respect to the pressure plate 1 is the friction force generated by the return force of the tangential tongues. If the load of the actuating hub 40 is sufficiently high to overcome this force, then, with the spring 40 bearing on the worm 13 through (in this example) the ratchet wheel 20, the worm 13 in engagement on the teeth 18 rotates the support 12 and therefore the ramps 15. Because of this rotation, the ramps 15 of the ramp means 11, by cooperation with the pads 4 of the pressure plate 1, will displace the pressure plate 1 further away from the base of the cover plate 2, thereby increasing the axial distance between the working face of the pressure plate 1 and the engagement zones 14 of the ramp means 11. In this way, the displacement of the pressure plate 1 which is due to wear in the clutch liners is at least partly taken up.

Figure 5:
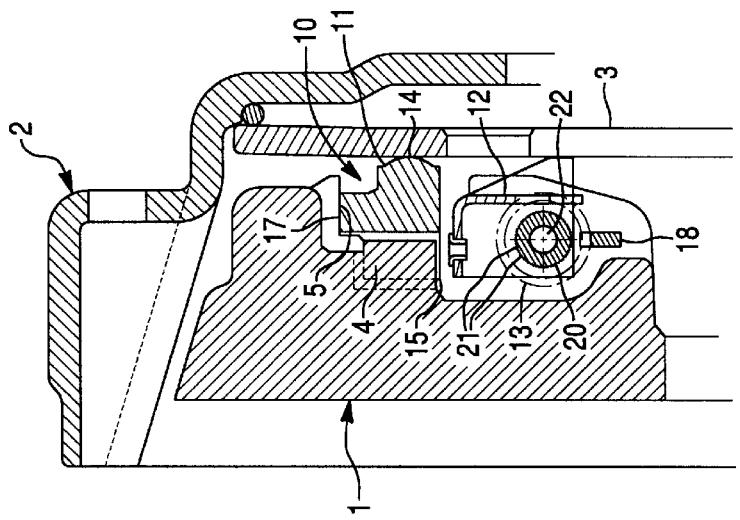
FIG. 5 is a view similar to FIG. 3, again after some liner wear.

Since the load exerted by the helical spring 40 is a function of the amount by which it will have been compressed by the worm 13 during the wear phases, it can be seen that a number of operations of engaging and disengaging the clutch may be necessary before the wear compensating device 10 enters into a wear take-up phase proper, this being dependent on the relative dimensioning of the components involved. By way of example, these components may be so made that the wear take-up phase proper only happens the first time after a certain degree of wear has taken place. In FIG. 5, corresponding to the disengaged state of the clutch, it is supposed that wear in the liners has been sufficient for the control tongue 35 during the previous clutch engaging operation to have turned the ratchet wheel 20 enough for the control tongue 35 to have jumped a tooth.

Thus, it is during the next following clutch engaging operation that the control tongue 35, pushed by the diaphragm 3, causes the ratchet wheel 20 to rotate, so that the latter compresses the spring 40, and during the next following clutch disengaging operation, the ramp means 11, which are not gripped by the diaphragm 3 rotate under the action of the actuating means which in this example consist of the spring 40 if the load is sufficient, and in so turning they compensate for the displacement of the plate due to wear. At the end of the wear take-up operation, the diaphragm 3, ratchet wheel 20 and control tongue 35 revert to a position close to the position that they occupied in FIG. 2.

Thus, as described above, the faces 36A of the flanks 36 of the slot 37 formed in the spine portion 19 of the support 12 limit the course of travel of the control tongue 35 when there is no wear to be compensated for.

As has already been mentioned above, the wear take-up device ensures for the clutch engaging means (the diaphragm in this case) a common engagement position regardless of the amount of wear, namely the position which is occupied in practice with liners in the new state during their fitting on the vehicle. It is of course important that this position, which is the so-called nominal position, should correspond to the desired load (or nominal load) exerted by the diaphragm on the pressure plate with the clutch engaged. The position of the diaphragm, in other words its inclination, is clearly fixed by those of the primary and secondary abutments on which its outer part, in the form of a Belleville ring, is in engagement. The primary abutment is carried by the cover plate and the position of the secondary abutment is a function of the positioning of the ramp means with respect to the associated reaction or counter-ramp means. Positioning is ensured by the regulation function which is itself provided by the assembly consisting of the ratchet wheel, worm and control tongue, the latter being adapted to cooperate with the control abutment.

This assembly constitutes a cassette having a specific support for fitting of the above mentioned assembly.

In order to put primary and secondary abutments of the diaphragm in a nominal position of the diaphragm defined by the axial distance E in FIG. 2, the mechanism is associated with a notional friction disc, and a certain number of clutch engaging and disengaging operations are carried out until the control tongue in engagement on the control abutment no longer jumps over a tooth of the ratchet wheel. The secondary abutment of the diaphragm is now correctly positioned.

As can be seen, the clutch mechanism is constructed by assembling together various components. These components are manufactured, and their assembly carried out, with certain tolerances. This affects the accuracy of the relative positioning of the primary abutment and control abutment when these latter are formed on different components, as in the case in the patent specification cited above in which the primary abutment is carried by the cover plate and the control abutment by the support assembled to the cover plate. In order to overcome this disadvantage, it has been proposed, in particular in the specification of French patent application No. 98 16547 filed on Dec. 29, 1998, to form the control abutment, and also the primary abutment means, on the cover plate.

It is accordingly easy to position the control abutment accurately with respect to the primary abutment means, especially when the primary abutment means are made in the form of circumferential press-formed elements formed in the base of the cover plate, the primary abutment means and the control abutment being formed in the same operation of fabricating the cover plate. However, the required positional accuracy is not always obtained, this depending on the type of primary abutment means used.

Therefore, adjusting means are provided for adjusting the nominal position of the diaphragm defined in FIG. 2 at E.

Reference is now made to FIGS. 11 to 14, which show a first embodiment of an adjustable control abutment applied to the clutch mechanism described above with reference to FIGS. 1 to 10.

In this example, the control abutment consists of a tongue 136 which will be called an abutment tongue. More precisely, the abutment tongue 136 extends radially along the spine portion 19 of the support 12 on the inner side, that is to say on the other side of the spine portion 19 from the resilient member 31. It has an axial return by which the support 12 can be fixed, for example with the aid of the same rivets 34 by which the resilient member 31 is secured to the support 12. The free end of the abutment tongue 136 is formed with a slot, the edges 136A of which precisely define the control abutment, the end portion 33 of the resilient member 31 being H-shaped, to define a cross member lying in the slot, while the free leg of the H constitutes the control tongue 35.

The resilient member 31 is formed with a hole 133 giving access for a tool to a screw 119 which is screwed into the spine portion 19 of the support 12, for the purpose of turning the screw. The screw extends through the spine portion 19. The end of the screw 119 is in cooperation with the abutment tongue 136 for adjusting the position of the abutment tongue 136 with respect to the spine portion 19 of the support 12, and therefore for adjusting the distance d by which the abutment zones 14 and the part of the resilient member 31 with which the diaphragm 3 is arranged to cooperate in operation, are separated.

Figure 14:
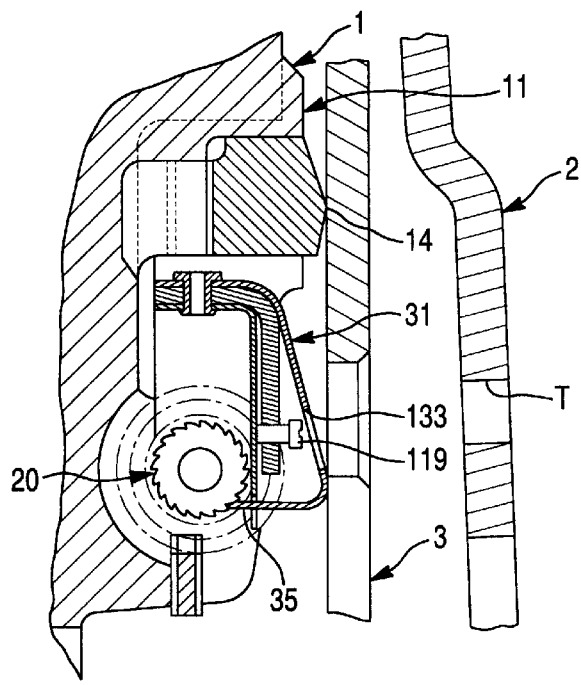
FIG. 14 repeats part of FIG. 2, showing the clutch according to the invention on a larger scale.
Figure 15:
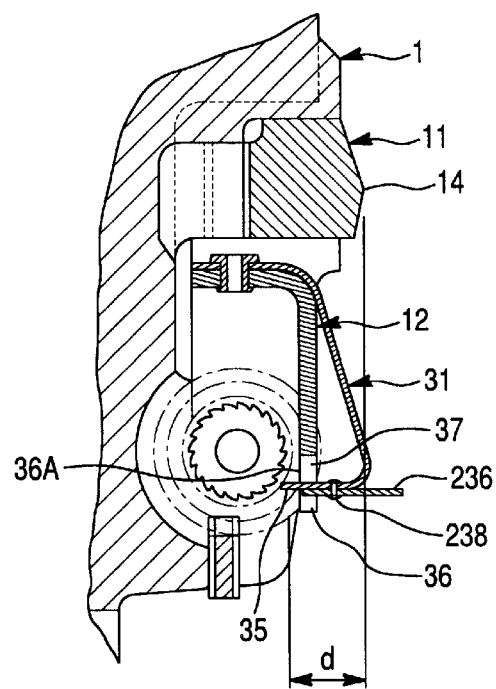
FIGS. 15 to 18 are generally similar to FIGS. 11 to 14 respectively, but they illustrate another version of clutch according to the invention.
Figure 17:
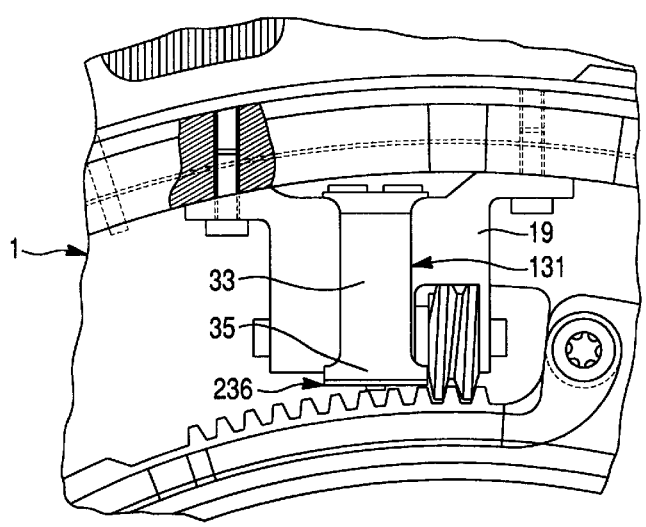
Figure 16:
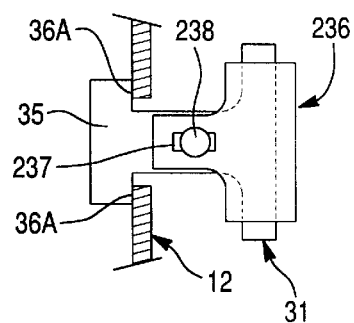
Figure 18:
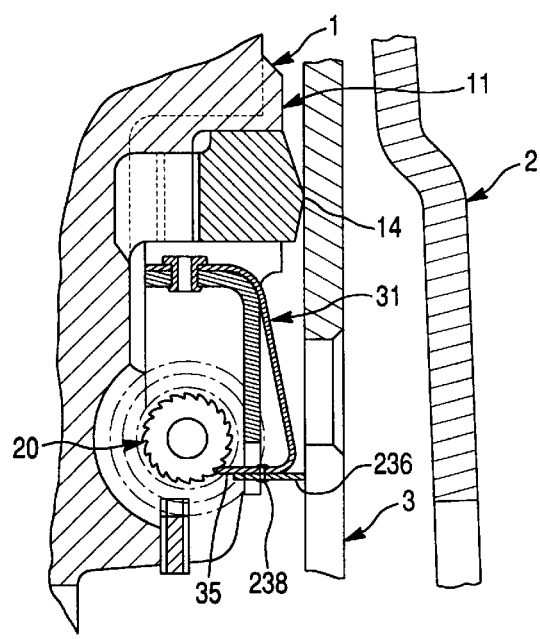

FIG. 14 shows the mechanism in the clutch engaged state, in which the diaphragm 3 is in contact with the resilient member 31, while the control tongue 35 has its end at the root of one tooth of the ratchet wheel 20. As can be seen, the adjustment is both simple and rapid. A hole T in the cover plate 2, in line with the access hole 133, does of course permit access to be obtained to the adjusting screw 119 from outside the mechanism.

Reference is now made to FIGS. 15 to 18, which as mentioned above are generally similar to FIGS. 11 to 14 respectively but which show another version of the abutment adjustment. In this case, the resilient member 31 carries a claw 236 in the form of a leaf extending the control tongue 35, with respect to which the position of the claw 236 is adjustable. To this end, the claw 236 is provided with a slot 237, while a fastening member 238, such as a rivet, assembles the claw 236 to the resilient member 31. The diaphragm 3 cooperates with the resilient member 31 through the claw 236. Thus, in this version, it is the axial length of the control tongue that is adjustable.

It will be understood that the invention is applicable regardless of the type of clutch, i.e. whether it is of the pull-to-release or push-to-release type, and also regardless of the type of wear compensating or wear take-up device used.

Figure 19:
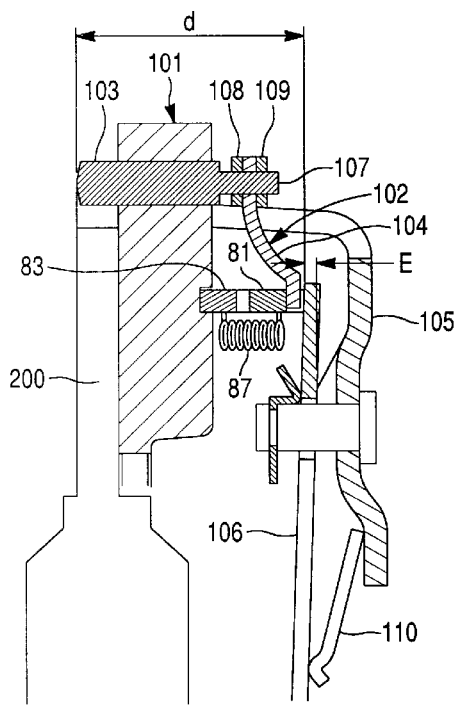
FIG. 19 is a simplified partial view in axial cross section illustrating a further version of a clutch according to the invention.

Reference is now made to FIG. 19, which shows part of a clutch of the same type as that described in United Kingdom patent specification GB 2 294 983A, to which reference should be made for further details. In the present case, the clutch engaging means consist of a diaphragm 106 which is articulated on the cover plate 105, the displaceable abutment being the pressure plate abutment and the clutch being of the push-to-release type.

The detecting means 102 consists of a pin 103 extending through the pressure plate 101 with friction, and carrying an arm 104 which cooperates with the ramp means 81, limiting rotation of the latter on each wear take-up operation, the counter-ramp means 83 being fixed, axially and circumferentially, to the pressure plate 101. A helical spring 87 constitutes the means for actuating the wear take-up device, and, in the conventional way by relative circumferential displacement, biases the ramp means 81 with respect to the counter ramp means 83 in the direction of increase of the axial thickness of the assembly consisting of the ramp means and counter-ramp means.

In this example, the pin 103 and the arm 104 are connected axially together in an adjustable way such that the axial distance d between the displaceable abutment of the diaphragm and the end of the pin 103 can be adjusted. In the example shown in FIG. 19, the pin 103 is formed with a threaded tail 107 extending through a hole in the arm 104 and secured on the tail 107 by means of a nut 108 associated with a clamping nut 109.

In the example here shown, a Belleville ring 110 is provided between the fingers of the diaphragm 106 and the cover plate 105. As is known per se, such a ring 110 assists the declutching operation. Adjustment of the detection means 102, which as already seen enables perfect regulation of the position of the diaphragm and therefore the load on the pressure plate 101 to be obtained, is of particular relevance where the assistance ring 110 is provided. In this connection, assistance in the declutching operation is obtained by a combination of the load curves of the diaphragm and of the assistance ring. These two components must be positioned axially with accuracy.

Figure 20:
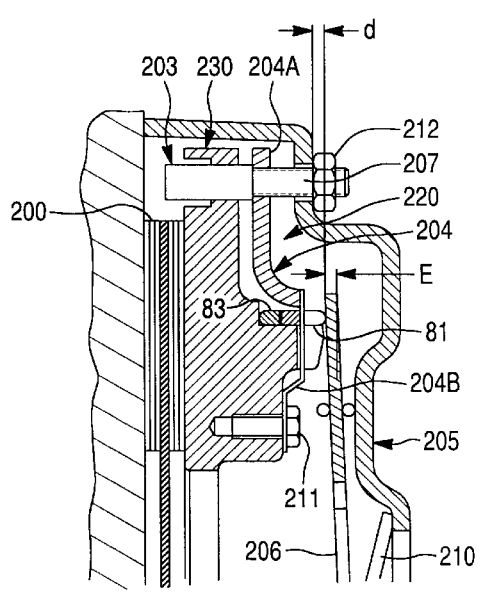
FIGS. 20 to 22 are generally similar to FIG. 19, but they each show a respective further modified version of the clutch.

Referring now to FIG. 20, this shows another version in which the detection means 220 includes a pin 203 extending through the pressure plate 230 with friction, and carrying a lever 204 in two parts, namely a rigid part 204A mounted on the tail 207 of the pin 203, and an elastic part 204B which extends radially through the ramp means 81 via a slot formed in the ramp means. The elastic part 204B is fixed to the pressure plate 201 by means of a screw 211. The elastic piece 204B is mounted in a prestressed condition such that it applies the rigid piece 204A against the shoulder defined at the root of the tail 207, the diameter of which is smaller than that of the body of the pin 203.

In this example, the tail 207 of the pin 203 extends through the cover plate 205, on which it is engaged axially by means of an axial abutment formed in it. This axial abutment is defined by a locking nut 212 which is screwed on the tail 207, the latter being threaded accordingly. Thus, the axial position of the rigid piece 204A of the detecting means 202, and therefore that of the elastic piece 204, is adjustable. As will have been understood, the position of the elastic piece 204 determines that of the diaphragm 206.

Figure 21:
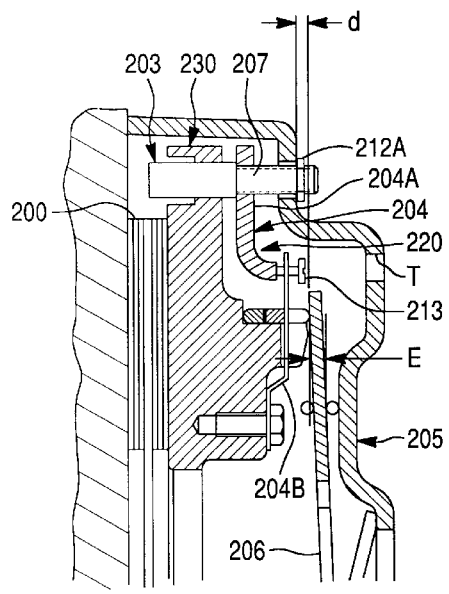

Reference is now made to FIG. 21, in which the pin 203 is secured axially to the cover plate 205 by means of an axial abutment 212A which is not adjustable, and the position of the elastic piece 204B of the detection means 220 is adjustable by means of a screw 213 which is screwed into the elastic piece 204B and in contact with the rigid piece 204A.

Figure 22:
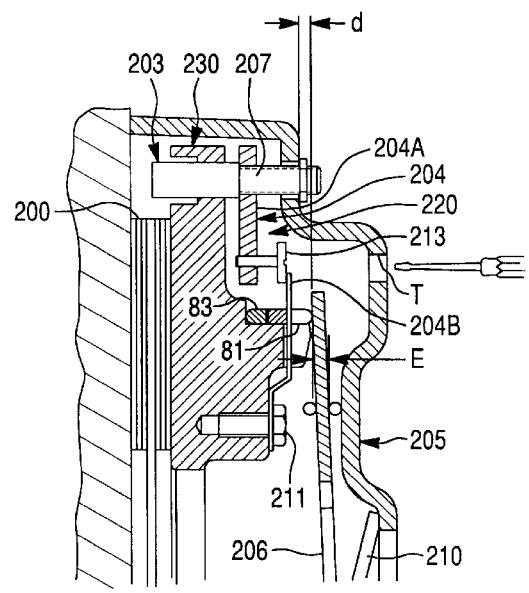

With reference now to FIG. 22, this is similar to FIG. 21, except that the screw 213 is screwed into the rigid piece 204A and the elastic piece 204B is in engagement on the head of the screw 213.

In the versions shown in FIGS. 21 and 22, a hole T in the cover plate 205 gives access to the screw 213 by enabling an adjusting tool, such as a screwdriver shown in FIG. 22, to be passed in.

Figure 23:
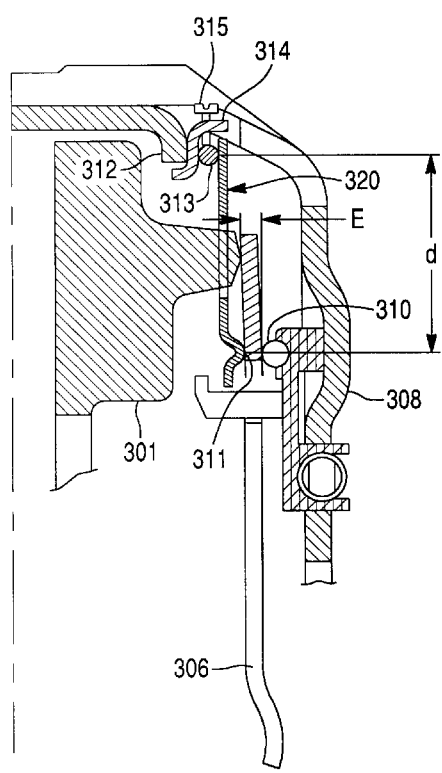
FIG. 23 is generally similar to FIG. 20, but shows yet another version of the clutch according to the invention.

Reference is now made to FIG. 23. This shows part of a clutch of the same type as that described in United Kingdom patent specification No. GB 2 294 301A to which reference should be made for more detail. Here, it will merely be mentioned in this connection that the clutch engaging means consist of a diaphragm articulated on the cover plate, the clutch being of the push-to-release type. In the present example, this articulation comprises a primary abutment 310 on the cover plate side and a counter abutment 311 on the same side as the pressure plate 301 and situated in facing relationship with the primary abutment 310. In the present example, the displaceable abutment is the primary abutment 310 and the adjustment is obtained by displacement of the counter abutment 311 which is in cooperation and engagement with an elastic component 320 called an adjusting piece, which is itself in engagement on the cover plate 308. The detection means consists of the maximum load applied during the declutching operation, and therefore the load component delivered by the adjusting piece.

The position of one of the abutments of the elastic adjusting piece 320 is adjustable. In FIG. 23, the elastic adjusting piece 320, which in this case is in the form of a diaphragm, also constitutes the detecting means and is in engagement on the cover plate 308 through one or more lugs 312 projecting from the cover plate 308 and extending radially inwards of the latter. To the extent that wear take-up operations take place, the abutments 310 and 311 are displaced towards the reaction plate, and the elastic adjusting piece 320 becomes progressively inclined. Between the lugs 312 and the elastic adjusting piece 320, there is an open ring 313 consisting of one or more sectors, which is held in place by means of a support 314 in the form of a crown carried by the cover plate 308. A screw 315 (or several screws) are screwed into the support crown 314 and extend radially. The screw 315 is arranged to cooperate with the open ring 313 in such a way that the diameter of the latter can be adjusted, so that the characteristics of the adjusting piece 320 are thereby adjusted. Thus, the adjustment affects the radial distance d between the open ring 313 and the counter abutment 311 of the diaphragm.

Figure 24:
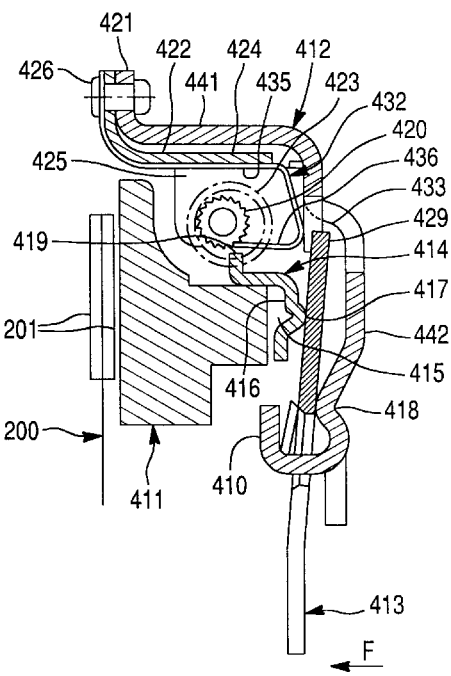
FIG. 24 is another simplified view showing part of a clutch in axial cross section, the clutch here being a clutch of a type known in the prior art.

Reference will now be made to FIG. 24, which shows a friction clutch mechanism, especially for a motor vehicle, which comprises a pressure plate 411 arranged to cooperate with a friction disc 200. The disc 200 consists of a radial plate or support disc which in this example carries at its outer periphery friction liners 201, and which itself cooperates with a reaction plate.

The pressure plate 411, besides being fixed to the cover plate 412 for rotation with the latter, is accordingly displaceable axially with respect to the cover plate 412 under the biasing action of controlled, axially acting resilient means, which in this example consists of a diaphragm 413, articulated on the cover plate 412 by means of lugs 410 that project from the inner periphery of the base 442 of the cover plate 412, and by means also of press-formed bosses 418 of circular arcuate form which are formed in the base 442 of the cover plate 412. The bosses 418 offer a primary abutment for the diaphragm 413. In this example the clutch is of the push-to-release type, with the declutching operation being effected by acting on the ends of the fingers of the diaphragm 413 in the direction of the arrow F in FIG. 24, in which the clutch is shown in its disengaged condition.

In order, when the clutch is engaged, to maintain the axially acting resilient means 413 in a position independent of wear in the liners 201, and to a lesser extent wear in the pressure plate and reaction plate, the so-called friction faces of which become worn in contact with the liners 201 of the friction disc 200, a wear compensating or wear take-up device is provided which includes ramp means 414 having ramps 416 which are disposed circumferentially. More precisely, the ramp means 414 consist of an annular ring on which the ramps 416 are arranged in a circle on the face of the ring which faces towards the pressure plate 411. On its opposite face, the ring has an abutment zone 417, referred to as a secondary abutment zone, which consists of a rounded edge at the top that is in the form of a circular arc and is centred on the axis of the clutch. This secondary abutment zone 417 can of course be either continuous or discontinuous. It is located radially outside the primary abutment 418.

The pressure plate 411 has, on its face that faces towards the base 442 of the cover plate 412, a transverse engagement face carrying counter-ramp means which comprise counter-ramps 415. These are in the form of pads in this example, spaced apart on a pitch circle by a distance which corresponds to the distance by which two successive ramps 416 are similarly separated, each counter-ramp 415 being arranged to cooperate with a respective ramp 416.

The ramp means 414 are located axially between the diaphragm 413 and the counter-ramp means, so that the pads 415 receive the ramps 416, and the diaphragm 413 is in cooperation with the secondary abutment zone 417. The latter therefore provides the abutment means through which the diaphragm 413 acts on the pressure plate 411.

The outer periphery of the ramp means 414 is formed with a row of integral teeth 419. The wear take-up device also includes a ratchet wheel 420 with inclined teeth, which is mounted for rotation about a spindle that also carries a worm 423. The spindle is carried by, and rotatable in, a support 422 fabricated by stamping and bending from metal plate and generally U-shaped, having a spine portion 424 and two wing portions 425 arranged to support the spindle. The support 422 is fixed to the cover plate 412 by means of lugs formed in the spine portion 424 and wing portions 425. In this example, this fastening is by means of rivets 426 to the outer periphery of the cover plate, radially outside the abutment zone 418, and in a press-formed element formed towards the outside in the skirt 441 of the cover plate 412.

An elastic member 432, which in this example is of metal and is thinner than the support, has a generally U-shaped axial cross section and includes two axially oriented wing portions 435 and 436. The wing 435 is secured by two of the rivets 426 (in this example) on a transverse flange 421 of the cover plate 412. The other wing 436 of the member 432 is configured as a control tongue which constitutes the detection means. A helical compression spring, which constitutes the actuating means, is located around the spindle. In this example the control abutment is defined by a radial lug 433 projecting from the base 442 of the cover plate 412 and formed by stamping and bending.

Figure 25:
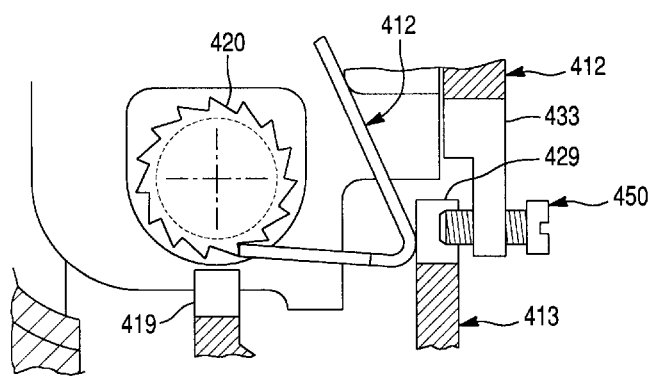
FIG. 25 is a scrap view in axial cross section showing how the invention can be applied to the clutch shown in FIG. 24.

Reference is now made to both FIGS. 24 and 25. FIG. 25 shows one application of the invention to a clutch of the kind just described with reference to FIG. 24. Here, a screw 450 extends axially through the lug 433 to which it is screwed. This screw 450 limits the displacement of the elastic member 432, the position of which is easy to adjust with the clutch disengaged.

Reference is now made to FIG. 26, which shows in simplified form part of a clutch of the same type as that described in U.S. Pat. No. 5,564,541 in FIGS. 1 to 9. Reference should be made to that patent for more details. In this case, the clutch is of the pull-to-release type. The clutch engaging means consist of declutching levers 550 associated with helical springs 551 which bear on the cover plate 508 on the one hand and on a declutching control member 554. The inner ends of the levers 550 are engaged with the control member 554.

The outer ends of the levers 554 are articulated on a crown 588 which carries ramp means 552 cooperating with counter-ramp means 553. It is therefore the abutment on the same side as the cover plate 508 which is displaceable. The crown 588 is engaged with the cover plate by means of tangential elastic tongues 516 which bias the ramp means 552 and counter-ramp means 553 axially into engagement with each other.

In this example, a pin 560 extends frictionally through the cover plate 508. More precisely, it has on its outer cylindrical face a friction surface 561 with which it is in frictional cooperation with the cover plate 508. This friction is such that the force necessary to cause the pin 560 to slide with respect to the cover plate 508 is greater than the axial return force of the pressure plate 501 exerted by return tongues 515, but smaller than the axial load exerted by the clutch engaging springs 551. The pin 560 constitutes the detection means.

In this example, the clutch is associated with a braking device for exerting a braking force on the input shaft of the gearbox, which is the driven shaft driven by the friction disc of the clutch, during gear changes. FIG. 26 shows the friction element 595 of the braking device, which is fixed to the gearbox input shaft 596 and which is so arranged that, during the pull-to-release type operation of disengaging the clutch, it is gripped and therefore immobilised between a rear transverse face of the clutch release bearing 590 and a facing surface 597 of the gearbox casing.

The clutch release bearing 590 is mounted for sliding movement on the input shaft 596 by means of an internal sleeve 592 on which it is mounted. The free end 593 of the sleeve 592 has an external thread on which is screwed the internal hub 554A of the declutching control member 554. Thus, the position of the member 554 is adjustable axially, and this constitutes the detecting means. A backing nut 594 consolidates this position. In this example, the axial length of the clutch release bearing is, in effect, adjustable.

Reference is now made to FIG. 27, which shows the application of the version of the detecting means in FIG. 26 to a clutch in which the wear take-up device is of the same type as that described with reference to FIGS. 1 to 10, in which the clutch engaging and disengaging means consist of a diaphragm 551A. In this case, the operation of the wear compensating device is of course slightly different because the detecting means no longer has its course of travel limited by an abutment located within the clutch mechanism. Instead, it is within the braking device of the gearbox input shaft.

In this example, the ends of the fingers of the diaphragm 551A are engaged axially with a hub 554B which is adjustable axially on the sleeve 592.

What is claimed is:

1. A friction clutch for a motor vehicle, for releasably coupling a driving shaft with a driven shaft, and comprising: a reaction plate mounted on the driving shaft; a friction disc having an outer periphery and mounted in rotation on said driven shaft; friction liners carried on the outer periphery of the friction disc; a pressure plate; a cover plate fixed on the reaction plate; clutch engaging means operatively interposed between the cover plate and pressure plate, the cover plate defining primary abutment means and the pressure plate defining secondary abutment means, said primary and secondary abutment means being in engagement with said clutch engaging means; declutching means engaged with said clutch engaging means for controlling the clutch engaging means to act between the pressure plate and cover plate via said primary and secondary abutment means; means mounting the pressure plate and cover plate for rotation together while permitting axial displacement of the pressure plate with respect to the cover plate; elastic return means engaged with the pressure plate for biasing the pressure plate axially towards the cover plate, one of said abutment means of the clutch engaging means being axially displaceable; and a wear take-up device comprising a compensating means engageable with said displaceable abutment means for displacing the latter, wherein the wear compensating device further includes: actuating means connected with said compensating means for operating the latter; displacement means associated with the actuating means for controlling the actuating means; detection means for sensing wear in said liners and for controlling said actuating means in association with said displacement means, the detection means being arranged to act on at least one element selected from the group consisting of said actuating means, compensating means and displacement means, and wherein the clutch is so configured as to define a predetermined axial distance between said primary and secondary abutments when the clutch is engaged, adjustment means being further provided for adjusting the nominal position of the clutch engaging means defined by said predetermined distance.

2. The clutch according to claim 1, further comprising a control abutment for limiting the course of travel of the detection means when the clutch is disengaged, wherein a position of said control abutment is adjustable and defined by the distance between the control abutment and the said secondary abutment.

3. The clutch according to claim 1, wherein the compensating means comprises circumferentially disposed ramp means located between the said secondary abutment means and the pressure plate, and counter-ramp means adapted to cooperate with said ramp means.

4. The clutch according to according to claim 1, wherein said wear compensating device comprises a set of teeth and a tangentially disposed worm cooperating with said teeth, with said teeth being fixed with respect to an element selected from the group consisting of the ramp means and counter-ramp means, the compensating device, wherein said actuating means is coupled with the worm for driving the worm in rotation in response to wear in said liners when the clutch is engaged.

5. A clutch according to claim 4, wherein the said clutch engaging means consist of a diaphragm.

6. The clutch according to claim 4, wherein the worm has an axis and is displaceable along its axis, the compensating device further including a resilient take-up means, said actuating means for driving the worm in rotation consisting of a ratchet wheel fixed to the worm for rotation together, and a support, the worm and ratchet wheel being carried by said support.

7. The clutch according to claim 6, and including a control abutment for limiting the course of travel of the detection means when the clutch is disengaged, and means for adjusting the position of said control abutment defined by the distance between the control abutment and said secondary abutment, the compensating device further including a resilient member defining a control tongue coupled with said worm driving means for controlling the latter, said control abutment being arranged to limit the course of travel of said control tongue with respect to the ratchet wheel during disengagement of the clutch.

8. The clutch according to claim 7, further including a screw screwed into said support, said control abutment being an abutment tongue extending within said support and cooperating with said screw, said resilient member having a hole to give access to said screw.

9. A clutch according to claim 7, wherein the control abutment is a leaf adjustably attached to the control tongue.

10. A clutch according to claim 7, wherein the cover plate includes a base and a lug projecting from the said base, with a screw screwed into the said lug and constituting the said control abutment.

11. The clutch according to claim 1, wherein said clutch engaging means consist of a diaphragm articulated with respect to the cover plate, the displaceable abutment being the pressure plate abutment, the clutch being of a push-to-release type, the detecting means consisting of a pin extending through the pressure plate with frictional contact and carrying an arm cooperating with a ramp means to limit rotation of the latter on each operation of taking up wear, wherein said arm is carried adjustably by said pin.

12. The clutch according to claim 11, wherein the wear compensating device further includes a traction spring having two ends engaged with said ramp means and a counter-ramp means respectively, whereby the spring can urge the ramp means and counter-ramp means in relative rotational displacement in the direction of their axial spacing.

13. A clutch according to claim 11, further including an assistance ring, the diaphragm being associated with the assistance ring.

14. The clutch according to claim 1, wherein the clutch engaging means consist of a diaphragm articulated with respect to the cover plate, the displaceable abutment being the pressure plate abutment, the clutch being of a push-to-release type, said detecting means consisting of a pin extending through the pressure plate with friction, and a lever carried by said pin and cooperating with a ramp means to limit rotation of the latter on each operation of taking up wear, wherein said lever is in two parts, namely a rigid part carried directly by said pin and an elastic part carried by the pressure plate, said pin being engaged with the cover plate.

15. A clutch according to claim 14, wherein the said pin is adjustably engaged with the cover plate.

16. A clutch according to claim 14, wherein the cover plate has an access hole, the compensating device further including a screw accessible through the access hole and coupled with at least one of the said parts of the lever for adjusting the relative axial position of one said part with respect to the other.

17. A clutch according to claim 1, wherein the clutch engaging means consist of a diaphragm articulated with respect to the cover plate between two abutments, namely a primary abutment on the same side as the cover plate and a secondary abutment on the same side as the pressure plate, the secondary abutment being in facing relationship with the primary abutment, the clutch being of push-to-release type, the displaceable abutment being the primary abutment, the clutch further including an elastic displacement means engaging on the cover plate and cooperating with the said secondary abutment, wherein the diameter of the contact of the elastic displacement means on the cover plate is adjustable from outside the cover plate.

18. A clutch according to claim 1, of pull-to-release type associated with a braking device and a clutch release bearing, whereby the braking device is adapted to apply braking action in combination with the clutch release bearing on the said driven shaft during gear changes, the clutch engaging means being adjustably engaged with the clutch release bearing.

19. A clutch according to claim 18, wherein the clutch engaging means consist of declutching levers and helical springs associated with the said levers and bearing on the cover plate.

20. A clutch according to claim 18, wherein the clutch engaging means consist of a diaphragm.

* * * * *